United States Patent [19]

Woodson, III et al.

[11] Patent Number: 6,129,497
[45] Date of Patent: Oct. 10, 2000

[54] STACKER/RETRIEVER WITH OVERHEAD RACK ENTRY VEHICLE FOR PALLETLESS STORAGE

[75] Inventors: J. Thomas Woodson, III, Lititz; Dennis R. Schmehl, Lancaster, both of Pa.

[73] Assignee: Woodson Incorporated, Lititz, Pa.

[21] Appl. No.: 09/199,388

[22] Filed: Nov. 25, 1998

Related U.S. Application Data

[60] Provisional application No. 60/066,552, Nov. 26, 1997.

[51] Int. Cl.[7] .................................................... B65G 1/06
[52] U.S. Cl. .......................................... 414/277; 414/281
[58] Field of Search ................................... 414/277, 284, 414/281, 279

[56] References Cited

U.S. PATENT DOCUMENTS

| | | | |
|---|---|---|---|
| 3,536,209 | 10/1970 | Burch | 414/277 |
| 3,700,128 | 10/1972 | Noble et al. | |
| 3,800,963 | 4/1974 | Holland | |
| 3,805,973 | 4/1974 | Thompson | 414/284 |
| 3,850,317 | 11/1974 | Lumier | |
| 3,905,492 | 9/1975 | Maeda et al. | 414/284 |
| 3,921,828 | 11/1975 | Suizu | |
| 3,964,619 | 6/1976 | Irmler | 414/281 |
| 4,331,418 | 5/1982 | Klebe | 414/277 |
| 4,338,056 | 7/1982 | Abrahamson et al. | 414/281 |
| 4,395,181 | 7/1983 | Loomer | 414/279 |
| 4,466,765 | 8/1984 | Mautino | 414/277 |
| 4,549,841 | 10/1985 | Ishige | |
| 4,850,783 | 7/1989 | Maekawa | 414/281 |
| 5,324,157 | 6/1994 | Stolzer | 414/281 |
| 5,370,492 | 12/1994 | Gleyze et al. | 414/279 |
| 5,540,532 | 7/1996 | Carder et al. | 414/279 |
| 5,564,890 | 10/1996 | Knudsen, Jr. | |
| 5,848,867 | 12/1998 | Gagnon et al. | 414/281 |

*Primary Examiner*—Gregory A. Morse
*Attorney, Agent, or Firm*—James Creighton Wray; Meera P. Narasimhan

[57] ABSTRACT

The present invention provides an improved stacking and retrieving warehouse system that eliminates the use of expensive pallets. A storage and retrieval machine moves along floor tracks and top guide tubes between the racks in a warehouse. A carriage platform moves vertically along vertical masts of the storage and retrieval machine until it is aligned with the rack to be entered. Rails within the carriage align with rails within the racks, allowing the wheels of the rack entry vehicle to pass from the storage and retrieval machine into the racks. Vertical arms suspended from a lifting/lowering horizontal support member pack up goods stored on a pedestal within the racks. The good are picked up from the racks by the vertical arms of the rack entry vehicle and deposited on a pedestal within the carriage. The storage and retrieval machine transports the goods to a location to be deposited, stored, retrieved or unloaded. The present invention eliminates the need for pallets and the attendant additional equipment required by the use of pallets, resulting in a more efficient and inexpensive storage system.

21 Claims, 2 Drawing Sheets

STACKER/RETRIEVER WITH OVERHEAD RACK ENTRY VEHICLE FOR PALLETLESS STORAGE

This application claims the benefit of U.S. Provisional Application No. 60/066,552, filed Nov. 26, 1997

BACKGROUND OF THE INVENTION

Storage and retrieval systems use masts that move horizontally between storage racks, and carriages that move vertically on the masts. The horizontal and vertical movements are coordinated to place carriages opposite storage spaces in the racks to deposit or retrieve loads. In Deep Entry systems created by Woodson Incorporated, wheel driven rack entry vehicles move between aligned carriage and rack rails. Needs exist for providing improved storing and retrieving warehousing systems while, facilitating automation, decreasing handling times and reducing the costs involved.

SUMMARY OF THE INVENTION

The present invention addresses the needs through a system of storing and retrieving that eliminates the use of expensive pallets. The present invention uses racks with central load supporting pedestals and overhead load spanning supports on rack entry vehicles of a storage and retrieval machine. Stacked crates, for example milk crates in a preferred embodiment, are handled by the rack entry vehicles on the storage and retrieval machine carriages and are stored in the racks without using pallets. The storage and retrieval machine platform has parallel spaced pedestal supports which support the bottoms of end-to-end aligned and laterally spaced columns of stacked cases. Similarly aligned longitudinal pedestal supports extend through storage locations in the rack system.

Overhead rack entry vehicles are supported by wheels on parallel overhead rails above the storage and retrieval machine carriage platform. The rack system has aligned parallel overhead rails above each storage space. The overhead rack entry vehicle has eight driven wheels which move the vehicle into, along the out of the overhead rails in each rack storage space.

Long vertical parallel arms are suspended on lifting and lowering mechanisms on the vehicles. The arms extend alongside and through spaces between the columns of stacked cases. Horizontal supports extending from the bottoms of the arms pass under the stacked cases when the lifting and lowering arms are down. The horizontal supports engage and raise the stacked cases when the arms are raised. Bottoms of the cases are directly lifted from the lowered onto the support pedestals without using pallets. The system reduces the cost of the warehousing system by eliminating pallets. Elimination of the pallets facilitates flow of the stacked cases in the rack on the storage and retrieval machine platform and throughout the system. There are no pallets to load and unload. Pallet washer, transfer, buffer storage and auxiliary conveying systems are eliminated. Automation is facilitated and handling is speeded.

In dairy products warehouses, packaged products are received from production facilities in stacks of crates usually six high. The stacks roll along floor conveyors to assembly points, where in the past they have been accumulates side by side and pushed onto pallets to enter the warehouse system. After being stored and retrieved in desired order, the stacks are depalletized by pulling or pushing them off the pallets onto floor conveyors on which they move to truck load assembly lines. The present invention eliminates the palletizing and depalletizing steps, procedures, motions and apparatus, and eliminates the record keeping and designations involved with the palletizing and depalletizing.

Often the products spend less than a few hours in the warehousing system. Products move into and out of the system in timing sufficient only to allow full production runs of similar products and to temporarily store the products while other production runs occur. The temporary warehousing allows assembly of diverse product mixes on accumulating conveyors for loading transport and delivery trucks. Pushing stacks onto or off pallets, and handling the pallets themselves, adds time, expense and complexities to the rapid handling of the crated and stacked products. The present invention eliminates pallets and the attendant additional equipment necessary for palletizing and depalletizing loads and handling empty pallets.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
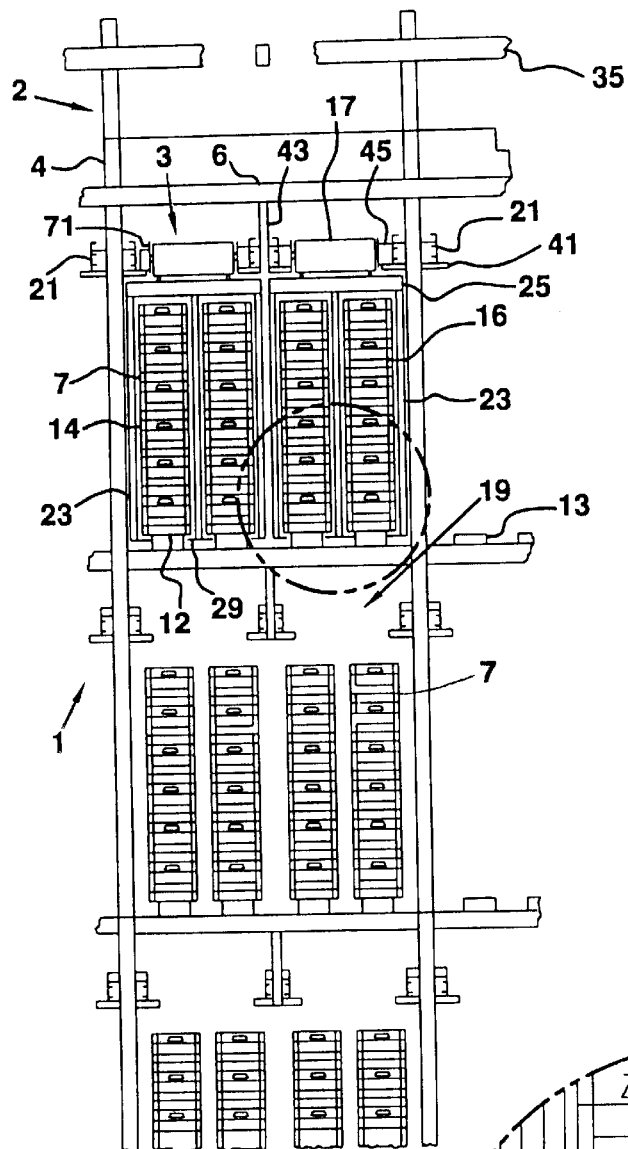
FIG. 1 is a partial front elevational view of a rack having storage locations with overhead rails, load supports and stacked crates thereon and showing two rack entry vehicles inserted in one storage location.

The present invention uses racks 1, shown in FIG. 1. The racks 1 are constructed as open frames 2 with vertical column members 4 supporting horizontal cross-members 6. The columns 4 and cross-members 6 define storage locations 19. Box beams connected between cross-members 6 form load support pedestals 13 on which the bottoms 12 of loads 14 rest. In the present case, the loads 14 which are stored and retrieved are stacks 16 of cases 7 holding packaged dairy products. When loading the cases 7, it is conventional to form stacks six high which are rolled around on floor conveyors having power or free rollers. The stacks are handled individually, or, preferably, are accumulated in groups of six stacks. For example, with six cases high and six stacks deep in the spaced columns, each rack entry vehicle is capable of lifting, moving and lowering a group of 72 cases. Carriage 5 with two rack entry vehicles 3 may move 144 cases.

Rails 41 are connected to the vertical column members 4 and to vertical beams 43 suspended from horizontal cross-members 6. The rails 41 receive the wheels 45 that support the rack entry vehicles 3. Supports 21 strengthen the connection between the rails 41 and the vertical column members 4.

Figure 2:
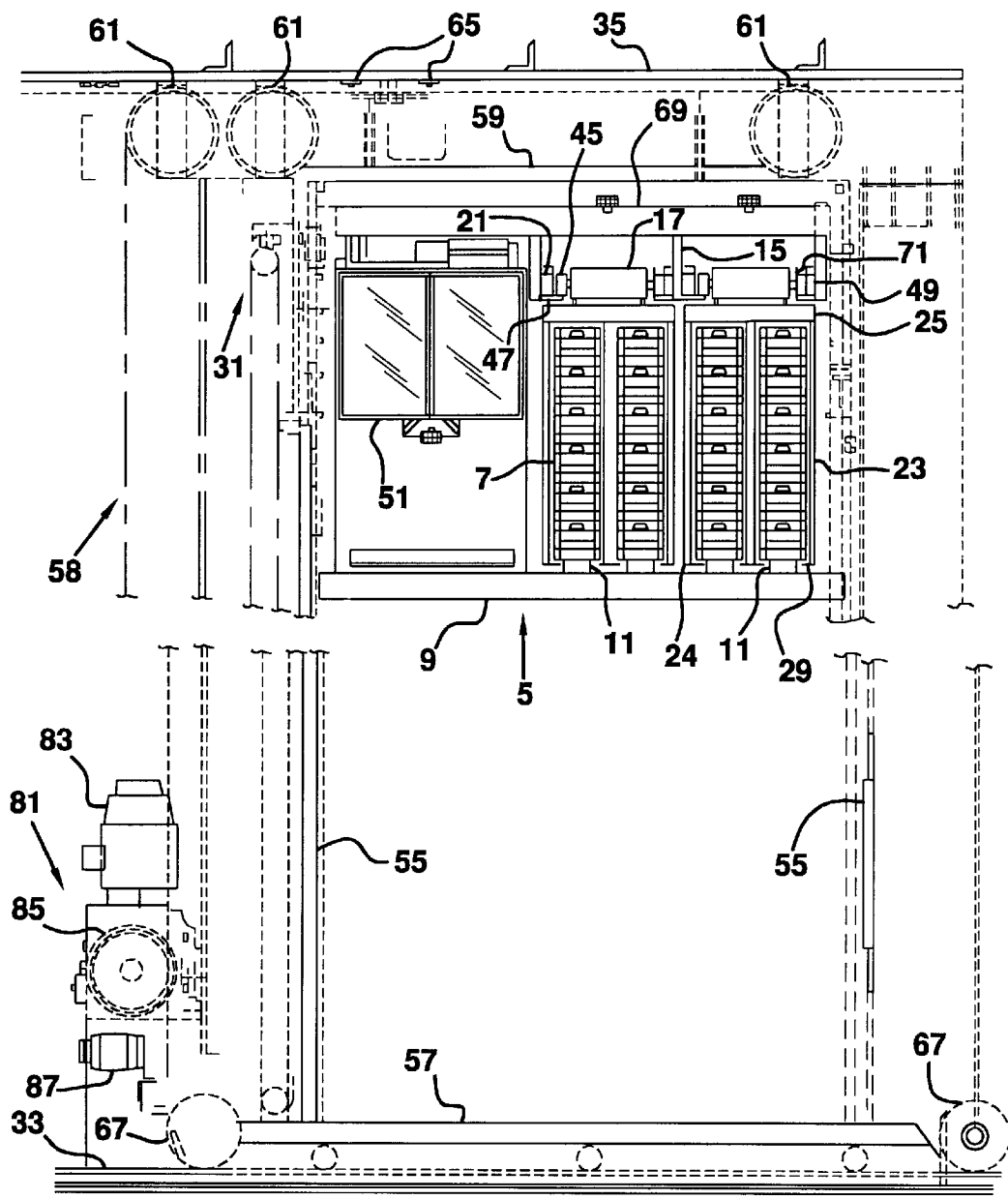
FIG. 2 is a foreshortened front elevational view of a storage and retrieval machine for operating between storage racks, and showing rack entry vehicles at home positions on the storage and retrieval machine carriage.

As shown in FIG. 2, groups of stacked cases 7 are handled by the rack entry vehicles 3 on the storage and retrieval machine carriage 5 and are stored in the racks without using pallets. The storage and retrieval machine carriage platform 9 has parallel pedestal supports 11 which support end-to-end aligned and laterally spaced columns of stacked crates. The pedestal supports 11 are aligned with the pedestal supports 13 within the storage locations 19. The rack entry vehicles 3 are supported on parallel rails 47, which are connected to the overhead members 69 of the carriage 5, above the carriage platform 9. Rails 47 support wheels 45 of the rack entry vehicles 3. Wheel guides 71 on wheels 45 maintain the position of the wheels on the horizontal rails 47 and 41 of the carriage 5 and the racks 1. Rails 47 within the carriage 5 are aligned with the rails 41 of the storage locations 19 for passing the rack entry vehicles 3 between the carriage 5 and the storage locations 19.

Figure 3:
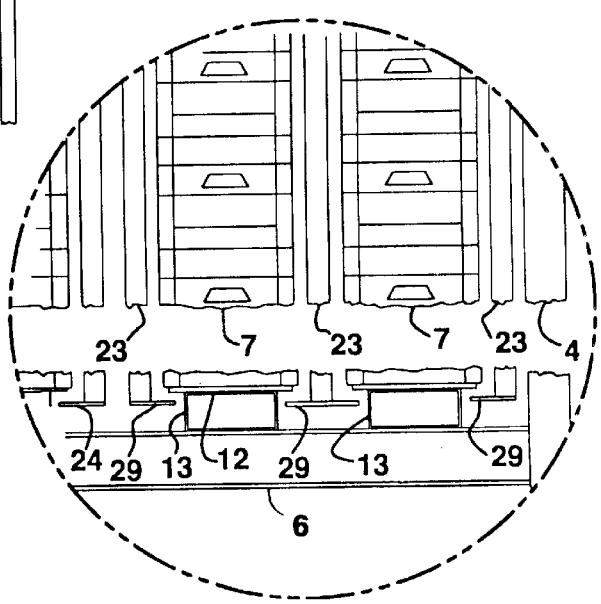
FIG. 3 is an enlarged partial front elevation of the lifting and lowering arms positioned between the stacked cases with the lifting shelves connected to the arms and showing the pedestal supports, as shown in FIGS. 1 and 2.

Long vertical lifting arms 23, preferably parallel, are supported by a lifting and lowering horizontal support member 25 of the rack entry vehicles 3. As shown in FIG. 3, the lifting arms 23 extend alongside and through spaces between the columns of stacked cases 7. Horizontal supports 29 flush with the bottoms 24 of the lifting arms 23 pass under the stacked cases 7 when the lifting and lowering arms are down, and raise the stacked cases 7 when the lifting arms 23 are raised. Bottoms 12 of the cases 7 are directly lifted and lowered without using pallets.

The rack entry vehicles 3 may be controlled, either automatically or manually by an operator in the control station 51 of the carriage 5. Electrical cords run from the control station 51 to the rack entry vehicle motors 17 to provide power for driving the wheels 45 and for raising and lowering the lifting arms 23.

The carriage 5 moves along vertical masts 55 that extend from the base 57 of the storage and retrieval machine 58 to its top 59. A drive 81 raises and lowers the carriage 5 to the desired height to align carriage pedestals 11 and rail 4 with pedestals 13 and rails 41 in the rack system storage location to be entered. The drive 81 includes a vertical motor 83, horizontal drums 85, and sheaves 61. An overspeed limiting device 31 prevents rapid movement of the carriage 5. Floor tracks 33 and top guide tubes 35 allow for movement of the storage and retrieval machine 58 between the racks 1. Guide elements 65 are kept aligned within the top guide tubes 35. Lower wheels 67 move the storage and retrieval machine 58 along the floor tracks 33.

While the invention has been described with reference to specific embodiments, modification and variations of the invention may be constructed without departing from the scope of the invention, which is defined in the following claims.

We claim:

1. A palletless storage and retrieval system comprising racks for storing goods, an overhead support system, a storage and retrieval machine connected to the overhead support system having a base and a top for moving horizontally between the racks, a carriage on the storage and retrieval machine for moving vertically between the racks, and at least one rack entry vehicle on the carriage for moving goods into and out of the racks.

2. The apparatus of claim 1, wherein the racks further comprise plural storage compartments, each compartment formed of horizontal and vertical members, and at least one pedestal on the horizontal members for receiving and supporting goods.

3. The apparatus of claim 1, wherein each rack entry vehicle further comprises a horizontal support member, a pair of parallel vertical lifting arms extending downward from the horizontal support member, a lifting flange connected to the bottom of each lifting arm, and a motor connected to the horizontal support member for driving the rack entry vehicle and for raising and lowering the lifting arms.

4. The apparatus of claim 1, further comprising a control station for operating the storage and retrieval machine and for supplying power to the rack entry vehicle motors.

5. The apparatus of claim 4, wherein the carriage further comprises an upper support member for supporting at least one rack entry vehicle, a platform for supporting the control station, and vertical members connecting the platform to the upper support member.

6. The apparatus of claim 5, further comprising at least one pedestal on the platform for receiving and supporting goods.

7. The apparatus of claim 5, further comprising vertical supports extending downwardly from the upper support member of the carriage and horizontal rails connected to the bottom of the vertical supports for supporting the rack entry vehicle.

8. The apparatus of claim 3, further comprising wheels connected to the motor of the rack entry vehicle for moving the rack entry vehicle into and out of the carriage and the racks.

9. The apparatus of claim 8, further comprising horizontal rails of the carriage for receiving the wheels of the rack entry vehicle.

10. The apparatus of claim 2, wherein the racks further comprise vertical beams extending downwardly from the horizontal members of the plural storage compartments and horizontal rails connected to the bottom of the vertical beams and connected at the same height to the vertical members of the plural storage compartments at the same height for receiving and supporting the rack entry vehicle.

11. The apparatus of claim 10, further comprising horizontal rails of the racks for receiving the rack entry vehicle.

12. The apparatus of claim 1, further comprising vertical masts connecting the base to the top of the storage and retrieval machine along which the carriage moves up and down.

13. The apparatus of claim 12, further comprising a drive system connected to the carriage for raising and lowering the carriage to a desired height.

14. The apparatus of claim 13, wherein the drive system is connected to a control station for controlling the raising and lowering of the carriage from the control station.

15. The apparatus of claim 14, further comprising controls for operating the drive system.

16. The apparatus of claim 15, wherein the controls are selected from a group consisting of automatic controls and manual controls.

17. The apparatus of claim 1, further comprising lower wheels connected to the base of the storage and retrieval machine for moving the storage and retrieval machine.

18. The apparatus of claim 1, further comprising guide elements connected to the storage and retrieval machine for guiding the storage and retrieval machine.

19. The apparatus of claim 1, further comprising top guide tubes for receiving the guide elements.

20. The apparatus of claim 17, further comprising floor tracks for receiving the lower wheels of the storage and retrieval machine.

21. The apparatus of claim 8, further comprising a wheel guide on each wheel of the rack entry vehicle for aligning the wheels with the horizontal rails of the carriage and the racks.

* * * * *